R. E. OVERMAN.
DRILL.
APPLICATION FILED OCT. 18, 1915.
1,218,579.
Patented Mar. 6, 1917.
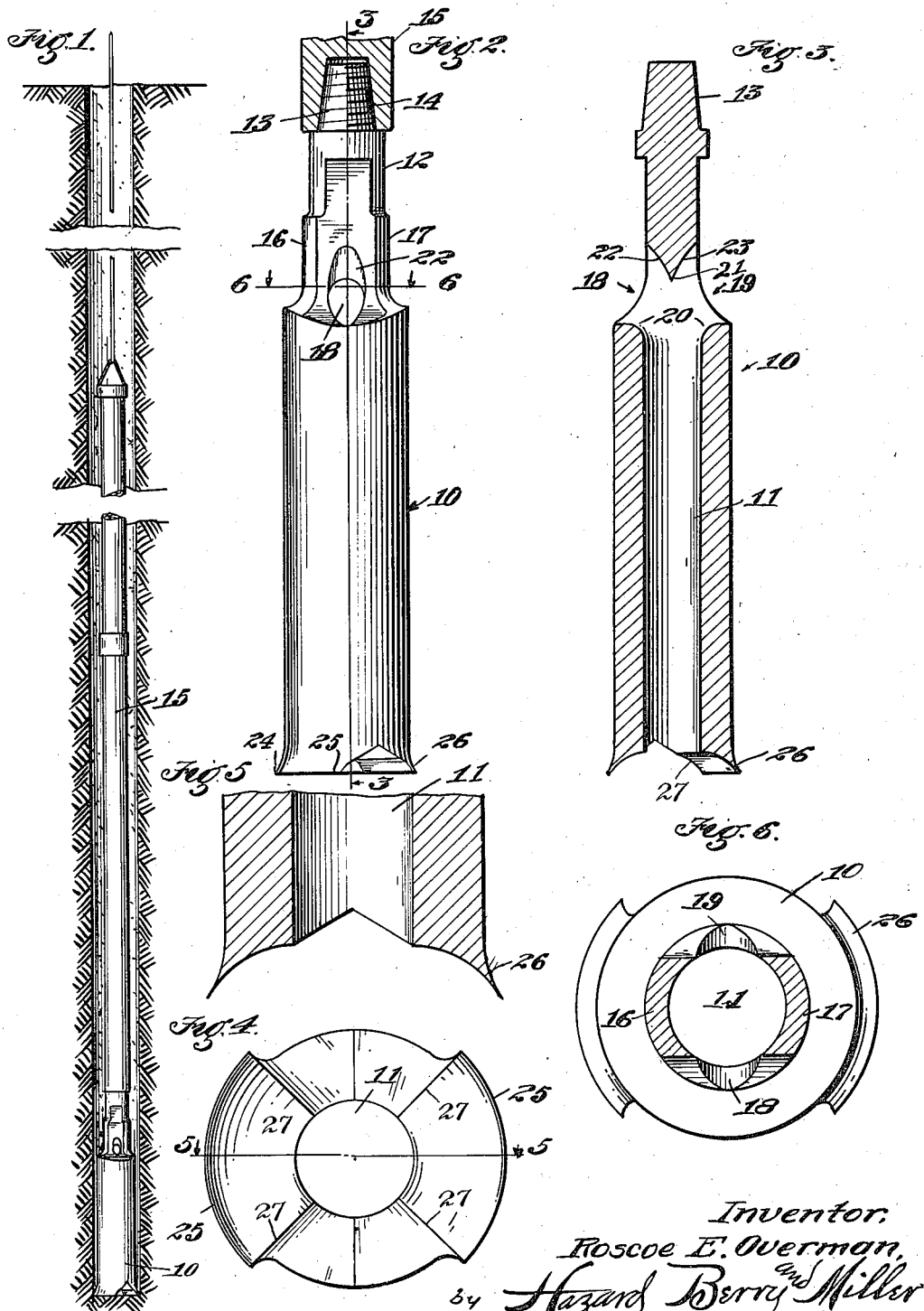
Inventor,
Roscoe E. Overman,
by Hazard Berry and Miller
Attys.

UNITED STATES PATENT OFFICE.

ROSCOE E. OVERMAN, OF LOS ANGELES, CALIFORNIA.

DRILL.

1,218,579.  Specification of Letters Patent.  Patented Mar. 6, 1917.

Application filed October 18, 1915. Serial No. 56,641.

*To all whom it may concern:*

Be it known that I, ROSCOE E. OVERMAN, a citizen of the United States, residing at Los Angeles, in the county of Los Angeles and State of California, have invented new and useful Improvements in Drills, of which the following is a specification.

This invention relates to a tool and particularly pertains to a bit or drill such as is employed in well drilling operations.

It is the object of this invention to provide a drill which is so constructed as to operate as a reamer to insure cutting a straight bore and thus obviate the objectionable feature common in the ordinary types of flat drills which, on failing to rotate, are deflected, thereby forming a crooked bore.

Another object is to provide a drill which is capable of rapid penetration so that a bore may be cut in less time than with the ordinary forms of drills.

Another object is to provide a drill which is so shaped that it will tend to automatically rotate while being reciprocated within its bore so as to insure its effective cutting action, which renders it particularly valuable for use at great depths.

Another object is to provide a drill or bit having a cylindrical body member adapted to be connected to a drill stem and which is formed with a central longitudinal passage leading from the cutting edge of the drill to its upper end through which the liquids and detritus in the well are conducted and which is provided with beveled arcuate cutting faces on its drilling ends, so formed and arranged as to facilitate the rotation and operation of the drill.

A further object is to provide a drill which is simple and economical of construction and which can be readily sharpened.

Other objects will appear hereinafter.

The invention is illustrated in the accompanying drawings in which:

Figure 1 is a view illustrating the application of the invention.

Fig. 2 is a view of the drill in side elevation.

Fig. 3 is a view in vertical section on the line 3—3 of Fig. 2, as seen in the direction indicated by the arrows.

Fig. 4 is a view in elevation of the cutting end of the drill.

Fig. 5 is a detail vertical section on the line 5—5 of Fig. 4.

Fig. 6 is a detail horizontal section and plan view as seen on the line 6—6 of Fig. 2.

More specifically, 10 indicates the body portion of the drill which is preferably cylindrical and tubular in form, having a central longitudinally extending bore or passage 11. The body member 10 is formed at its upper end with a shank 12 of reduced diameter, having a tapered threaded end 13 adapted to be screwed into the conventional socket 14 formed on a drill stem 15. The shank 12 spans the upper end of the passage 11 and is connected with the body member 10 through forked limbs 16 and 17 forming spaces or openings 18 and 19 which communicate with the upper end of the passage 11 on opposite sides of the drill. The upper end of the body portion 10 is beveled inwardly at the marginal edge of the passage 11 on diametrically opposite sides thereof where the passage 11 connects with the openings 18 and 19, as indicated at 20 in Fig. 3, to facilitate the intake and discharge of fluid to and from the passage 11. The portion of the shank 12 bridging the open end of the passage 11 and extending between the limbs 16 and 17 converges from its opposite sides to a thin edge 21 extending diametrically opposite the upper end of the passage 11 to form deflecting or guiding surfaces 22 and 23 to direct the flow of fluid to and from the passage 11 on opposite sides of the drill.

The lower end of the body member 10 is formed with a cutting edge of peculiar configuration to adapt it to its cutting operation and whereby it will act to ream the walls of the bore formed thereby and which coöperates with the cylindrical outer wall of the body member in insuring the formation of a straight or alined bore. This cutting edge is formed by flaring the lower end of the drill outwardly, as indicated at 24, and beveling the end of the body member inwardly from its outer marginal cutting edge 25, as indicated at 26. The cutting end of the tool is formed with V-shaped cut-away portions on its diametrically opposite sides, the side walls of which cut-away portions converge toward the longitudinal axis of the body member and terminating at their juncture with each other on a plane extending at right angles to the body member diametrically thereof. By this arrangement a pair of arcuate cutting members are formed on the end of the body member 10, the outer marginal or cutting edges 25 of which preferably extend one-fourth of the circle on which they are formed, as particularly shown in Fig. 4, and inclined end walls are formed on the cutting members which insures a slight rotation of the drill on its impact with the end of the bore, when the diametrically opposite inclined walls engage a projection on the bottom of the bore.

Radially extending cutting edges 27 are formed at the ends of the arcuate cutting edges 25 which coöperate with the latter in forming a circular bore when the drill is reciprocated; the drill rotating at each stroke so that the cutting edges will act throughout the circumference of the bore within a few strokes. The drill, therefore, cuts the cylindrical bore transversely in sections or segments, and not throughout the entire transverse area thereof. The tapered end face of the drill and the inclined or convergent walls at the ends of the cutting members will act to crowd the loosened materials toward the center of the bore and drill and become mingled with the liquids in the well which, when the drill is reciprocated, will pass through the interior of the drill as well as therearound. The loosened materials in the detritus can therefore escape from the one side of the drill to the other, both on the down and up strokes thereof, through the center of the drill, thus reducing the possibility of wedging of the drill in the bore to a minimum.

The passage 11 is preferably formed of a diameter equal to one-half the diameter of the body portion of the drill so that the thickness of each of the cutting members will be one-fourth the diameter of the drill. These proportions insure the severance of small particles by the drill and their free circulation through the passage 11.

By flaring the cutting edges outwardly beyond the outer wall of the drill they will have a reaming action and operate to cut a bore of a diameter slightly larger than the external diameter of the drill so as to enable free movement of the latter in its bore.

The passage 11 also serves to facilitate the pulling of the drill in event of cave-in of the bore, as in working the drill up and down within the bore, loose materials which are in the bore above the drill may pass to the underside of the drill through the passage 11 where such materials are of a size less than the diameter of the bore. In this pulling or drawing operation the tapered walls of the openings communicating with the upper end of the passage, facilitate the introduction of the loose materials into the interior of the drill.

In sharpening the tool the cut-away portion is deepened and the cutting members separated and re-ground on the beveled face thereof, which operation may be repeated until the drill body be worn comparatively close to its shank.

What I claim is:

1. A drill, comprising a tubular body member formed with an outwardly flared cutting end having the end face thereof beveled inwardly from its outer edge and formed with diametrically opposed cut-away portions, the side walls of which converge into intersection with each other and intersect the beveled end face radially thereof, forming the cut-away portions of V-shaped cross section of gradually increasing width from the inner margin of the end face to its outer edge.

2. A drill, comprising a tubular body member formed with an outwardly flared cutting end having the end face thereof beveled inwardly from its outer edge and formed with diametrically opposed cut-away portions, the side walls of which converge into intersection with each other and intersect the beveled end face radially thereof, forming the cut-away portions of V-shaped cross section of gradually increasing width from the inner margin of the end face to its outer edge, the portions of the end face between the cut-away portions having arcuate edges projecting beyond the outer face of the body member.

3. A drill, comprising a body member having an unchanneled outer wall and formed with a central longitudinal bore and having an outwardly flared cutting end, the outer edge of which is concentric with the center of the body portion and beveled inwardly toward the bore, said cutting end formed with V-shaped cut-away portions of gradually increasing width from the inner to the outer edge of the body member, said cut-away portions forming radial inwardly inclined cutting edges at the ends of the beveled end faces.

In testimony whereof I have signed my name to this specification.

ROSCOE E. OVERMAN.